United States Patent Office 2,887,266
Patented May 19, 1959

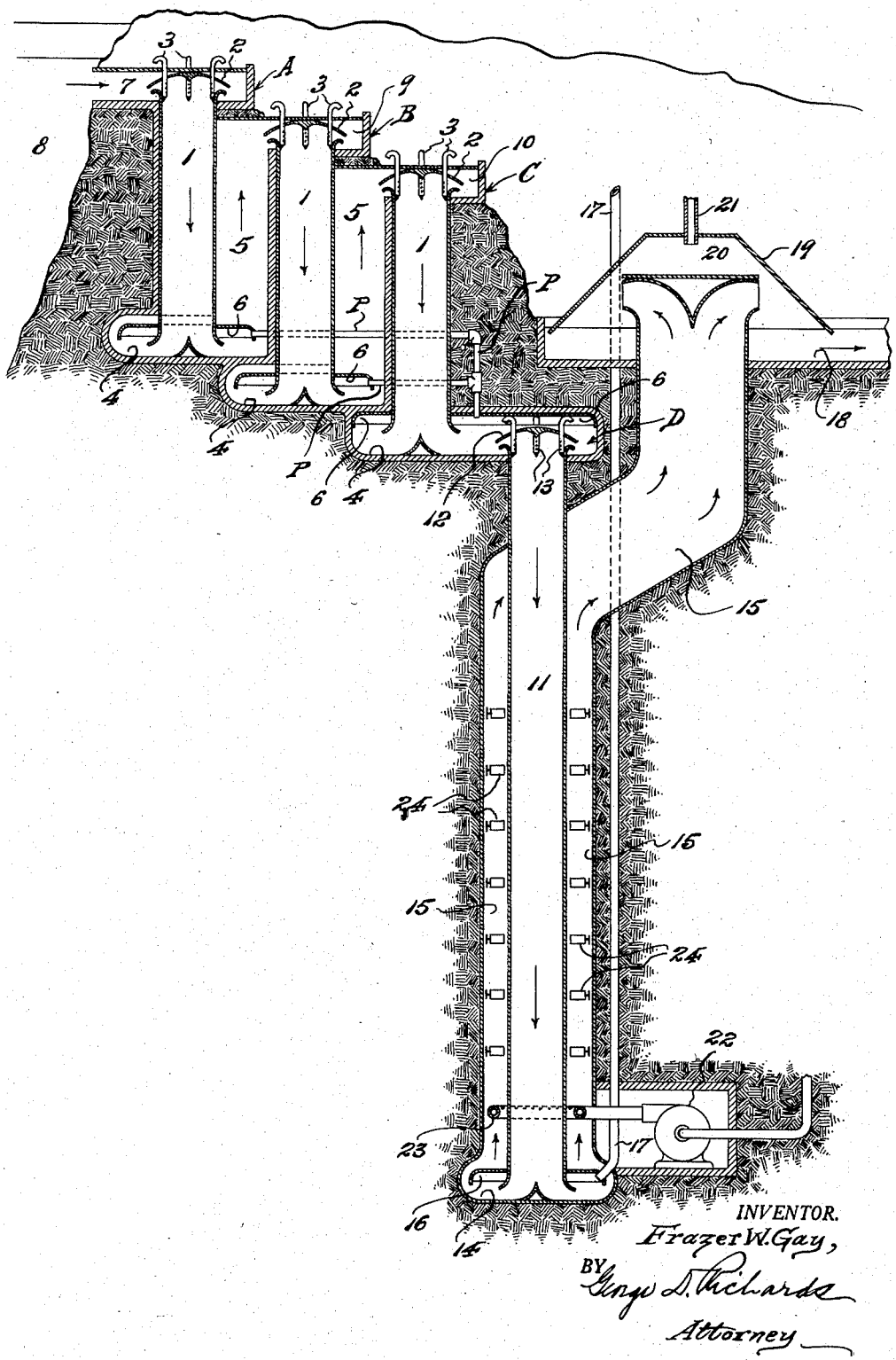

2,887,266

HYDRAULIC COMPRESSOR

Frazer W. Gay, Belvidere, N.J.

Application November 9, 1954, Serial No. 467,674

5 Claims. (Cl. 230—105)

This invention relates to improvements in hydraulic compressors operative to continuously provide compressed air or other gas, the output of which can be utilized for operating gas turbines driving electric generators, or for operating any other mechanisms or devices adapted to be actuated by compressed air or other gas.

In the performance of hydraulic compressors of heretofore known type, such e.g. as the Taylor compressor, in which air is the gas subjected to compression to 100 p.s.i.g. or higher, some of the compressed air dissolves in the water by which compression of the air is effected, and only part of such dissolved air comes out of solution so as to be released in the rising water. Due to this a certain amount of energy of compression is lost, and objectionable hysteresis of dissolved air coming out of solution occurs. The amount of air dissolved depends, in general, upon three basic principles:

(1) The size of the air bubble—the smaller the size of the air bubble, the greater the surface area of the bubble relative to its volume, and the greater is the percentage of air dissolved. The higher the final compression pressure, the smaller will be the size of the bubble as it leaves the water stream.

(2) The solubility of the gas—e.g. oxygen is substantially twice as soluble as nitrogen.

(3) The length of time the air bubble is exposed to the water before its release to a compressed air collecting chamber—the time the bubble is exposed to the water for absorption increases with the depth of the compressed air collecting chamber and decreases proportional to increase of velocity of water flow.

In view of the above stated principles, it is desirable to maintain a high velocity of water flow, thus shortening the time of bubble exposure to water, and to maintain the air subject to compression in relatively large bubble form so as to diminish occurrence of absorption by dissolution.

In a hydraulic compressor the air or other gas bubbles entrain in the falling water, with tendency to rise more or less slowly vertically relative to the descending water. The distance which the bubbles rise relative to the descending water during the period of compression involves a loss of compression efficiency. This being so, the faster the water flows the less will be the time of exposure of the air or gas bubble to likelihood of absorption or dissolution, and consequently absorption of dissolution will be less, such absorption or dissolution being proportional to pressure if other conditions are the same. Furthermore, the shorter will be the time for the bubble to rise vertically relative to the descending water stream. Due to these factors, for a desired velocity of water flow, there is a depth below which it is not economical to operate a simple hydraulic compressor.

Taking into consideration the above conditions, it is an object of this invention to provide a novel construction of hydraulic compressor which permits reduction of depth of excavation necessary for installation, and yet adapt the same to a given head and given diameter to obtain a desired velocity of water flow so as to reduce time of exposure to the water of entrained air or other gas bubbles, and thus diminish risk of undue absorption or dissolution of the air or gas thereby, and to avoid excessive pressure so that large bubbles entrained in the water will not be subjected to pressure so high as to compress said bubbles to as small a size as is ordinarily the case with respect to hydraulic compressors of heretofore known types.

The invention has for a further object to provide a hydraulic compressor structure wherein air or other gas is compressed in a plurality of low pressure compressor units operating in series relation to the water stream flowing therethrough, means being provided to collect compressed air or other gas in said low pressure compressor units and then introduce such collected compressed air or other gas into the onflowing water stream caused to descend a high pressure compressor unit, wherein said latter unit the low pressure air is further compressed isothermally to a final high or maximum pressure in the form of relatively large bubbles.

It is another object of this invention to provide a hydraulic compressor structure comprising a plurality of low pressure compressor units and a final high pressure compressor unit in series relation, wherein the low pressure units need extend only to relatively minor depth and only the high pressure unit need extend to a comparatively great or maximum depth.

Another object of this invention is to provide a hydraulic compressor structure comprising a plurality of low pressure compressor units and a final high pressure compressor unit, said units being successively arranged in cascade relationship, whereby, as the water flows onward from unit to unit it is repeatedly charged with air or other gas, and tendency of the air or other gas to be absorbed or dissolved is lessened.

An additional object of this invention is to provide the discharge passage of the high pressure compressor unit, through which water passes out of the hydraulic compressor, with means operative to encourage dissolved air or other gas still contained in the water to come out of solution; degasifying means being further provided, where the discharged water is admitted to a tail race, to collect and discharge air or other gas brought out of solution; said degasifying means being arranged to provide a vacuumized chamber to the low pressure atmosphere of which the outflowing water is subjected, whereby to induce a maximum amount of air or gas to come out of solution and to form relatively large bubbles tending to rise more rapidly in the discharge passage of the high pressure compressor unit, and to detrain from the water in said degasifying chamber.

The above and other objects will be understood from the following detailed description of this invention when read in connection with the accompanying drawing.

The drawing provides a schematic view in vertical section showing a hydraulic compressor according to this invention.

Referring to the drawing, the hydraulic compressor according to this invention comprises a succession of low pressure compressor units A, B and C of relatively minor head, the same being housed in earth excavations of minor depth adjacent a dammed back or other body of water from which the hydraulic compressor is to be supplied. Said low pressure compressor units are so arranged at successively stepped down levels that water from the supply can continuously flow, under gravity, from a preceding unit to and through a succeeding unit, i.e. with cascade effect. Although three low pressure compressor units are shown by way of illustration, it will be understood that more or less than such number may be provided. The last of the series of low pressure compressor units discharges the water to a high pressure compressor unit D of maximum head and depth.

Each low pressure compressor unit comprises an endwise open, perpendicular compressor column 1 of predetermined limited depth and of suitable diameter. Cooperative with the top end of the compressor column 1 is a suitably constructed aspirating head 2 that is equipped with air inspirators 3 leading into the top end interior of the column 1 from the atmosphere. The water entering and descending the column 1 tends to vacuumize the interior of the aspirating head 2, whereby atmospheric air is sucked in and injected into the water stream entering the column for descent therethrough. The bottom end of the compressor column 1 communicates with a catch basin 4 which, as to the low pressure compressor units A and B, leads into a rising discharge passage 5. Arranged around the compressor column 1, within the catch basin 4 and adjacently above the open bottom end of said column, is an annular compressed air collector 6 of inverted dome formation, the interior of which provides a settling out chamber into which bubbles of compressed air are discharged from the water leaving the compressor column 1.

The top end of the compressor column 1 of the first low pressure compressor unit A communicates with a head race 7 through which water passes from a dammed back or other body of water 8, serving as the water supply, into the hydraulic compressor system. The top end of the compressor column 1 of the second low pressure compressor unit B communicates with a raceway 9 through which water passes from the upper end of the discharge passage 5 of the first low pressure compressor unit A to said second low pressure compressor unit B. Similarly, the top end of the third low pressure compressor unit C communicates with a raceway 10 through which water passes from the upper end of the discharge passage 5 of the second low pressure compressor unit B to said third low pressure compressor unit C.

Compressed air detrained from the water in the collectors 6 of the respective low pressure compressor units A and B is discharged therefrom to the interior of the collector 6 of the low pressure compressor unit C by suitable delivery conduits or piping P, so as to be added to the compressed air detrained in the collector from the water descending the compressor column 1 of said low pressure compressor unit C.

The high pressure compressor unit D also comprises an endwise open, perpendicular compressor column 11 of maximum depth and suitable diameter, the top end of which communicates directly with the catch basin 4 of third low pressure compressor unit C, to receive the water stream directly from the latter. Cooperative with the top end of the compressor column 11 is an aspirating head 12 that is equipped with air inspirators 13 leading into the top end interior of said compressor column 11 directly from the compressed air collector 6 of said third low pressure compressor unit C, which collector is enlarged to extend over the top end of said compressor column 11 of the high pressure compressor unit D. The bottom end of the compressor column 11 communicates with a catch basin 14 which leads into a rising discharge passage 15. Arranged around the compressor column 11, within said catch basin 14 and adjacently above the open bottom end of said column, is an annular compressed air collector 16 of inverted dome formation, the interior of which provides a settling out chamber into which bubbles of high pressure compressed air are discharged from the water leaving the compressor column 11. The output of high pressure compressed air is discharged from the collector 16 through a discharge conduit or pipe 17, by which it is delivered to a desired place of use, as e.g. to serve as an actuating medium for a gas operated electric generator driving turbine, or as a medium for operating any other mechanisms or devices adapted to be actuated thereby.

The water discharged from the high pressure compressor unit D through its rising discharge passage 15 is delivered to a tail race 18, so as to be carried away thereby. As a further feature of this invention, the top outlet end of said discharge passage 15 communicates with a gas detraining or degasifying device 19 through which the discharged water stream passes to the tail race 18. Said gas detraining or degasifying device comprises an inverted hollow dome shaped member, the open bottom of which is sealed by submersion of its marginal portions below the surface of the water stream flowing out through the tail race 18. The water emerging from the discharge passage 15 spreads out within the lower portion of the chamber 20 provided by the interior of the gas detraining or degasifying device 19, so that it slows down to low velocity, whereby its kinetic energy is reduced to negligible value, thus giving time for any gas bubbles remaining therein to detrain and escape from the water stream into the upper portion of said chamber 20. The accumulated gas thus separated from the water is drawn off from the detraining or degasifying device through a discharge pipe or conduit 21 to a place of storage or use as may be desired. Such withdrawal of the gas from the upper interior of the detraining or degasifying device produces a vacuumized or low pressure effect above the water surface which greatly aids in promoting detrainment of gas bubbles from the water stream.

It will now be understood that the water stream, as caused to successively flow at reasonably high velocity, through the series of compressor units A, B and C of minor depth, i.e., of relatively short length, by reason of the short paths traversed thereby in the respective compressor columns of said units, substantially reduces the time of air bubble exposure to the water, as well as reducing the pressure of the water upon said bubbles. By reason of this, large bubbles injected into the water stream will not be subjected to such high pressure as will tend to compress the same to small size, with increased risk of undesired absorption and dissolution of the air or gas. The relatively low pressure to which air is compressed in the low pressure compressor units (e.g. to approximately three atmospheres or forty-five pounds) will possess a volume per unit of weight of only one-third that of atmospheric air; accordingly, three times as much free air or three times the weight of air is delivered to the aspirating head 12 of the high pressure compressor unit D, and thence introduced into the water descending the deep compressor column 11 of said unit.

The major part of the air carried by the water stream descending through the deep compressor column 11 of the high pressure compressor unit D will be compressed to maximum pressure and detrained in the collector 16 for discharge to the place of use.

In the operation of the hydraulic compressor system of this invention, some air may go into solution, so as to be eventually carried with the water upflowing through the discharge passage 15 of the high pressure compressor unit D. It is desirable to cause such dissolved air to come out of solution as quickly as possible, whereby to reduce hysteresis, and also to effect recovery of valuable constituents of said air, such as e.g. oxygen.

To aid dissolved air to come out of solution, means is provided to promote activity to such end. Such activity is promoted by injecting a suspension of fine sharp sand or other crystaline dust in water into the lower end of the column of water rising through the discharge passage 15 of the high pressure compressor unit D, so as to distribute said sand or the like throughout the water stream. The particles of sand or the like, as carried upward in the water stream, due to their comparatively greater specific gravity, tend to move more slowly upward than does the water stream, and by the resultant movement thereof relative to the water, to cause agitation of the latter which aids the dissolved air to come out of solution, and thus to form bubbles which can be detrained and separated from the water by the heretofore described detraining or degasifying device 19. One illustrative means for injecting the sand or the like into the water stream comprises a suitably located and driven pump 22, which is adapted to draw a suspension of sharp sand or the like in water from a suitable source of supply (not shown), and thereupon deliver the same into and for discharge from a distributer member 23 which is submerged in the water stream within the lower end of said discharge passage 15. It is also preferable to provide a multiplicity of additional, suitably driven, mechanical agitator devices 24, which are spaced at successive levels within the water stream traversing said discharge passage 15. These mechanical agitator devices serve to beat up or churn the surrounding water, being designed to operate much in the manner of egg beaters or like spinnable stirring devices. The local churning of the water, which is effected by said agitator devices 24, tends to release dissolved air or gas from the water so as to increase formation of bubbles thereof subject to detrainment and separation from the water by the degasifying device 19.

It will be understood that the hydraulic compressor system can be used and operated to recover different gases. For example, when air is the gas acted upon, that part of the air which goes into solution in the water and is subsequently brought out of the solution will contain a much larger percentage of oxygen than is contained in atmospheric air, since oxygen is more soluble than nitrogen, and this oxygen can be recovered by the operation of the degasifying device 19. As a further example, if flue gas is the gas acted upon, its contained carbon dioxide, which is highly soluble in water, can, when brought out of solution, be recovered in almost pure state, i.e., with very little accompanying nitrogen, by the operation of the degasifying device 19.

Having now described my invention, I claim:

1. A hydraulic compressor system operative to initially compress a gas to a relatively low pressure and then to an ultimate high pressure comprising a succession of low pressure compression units of minimum depth, each said unit comprising a descending compressor column communicating at its bottom end with a parallel conduit structure which provides a rising discharge passage, said units being respectively disposed at successive lowered levels, whereby a stream of compressing liquid can flow by gravity from the discharge passage of a preceding unit to the top of the descending compressor column of a succeeding unit, each said unit being adapted to compress a gas to the same initial low pressure, each said unit having a gas inspirator means communicating with the top end of its descending compressor column, each said unit having a compressed gas collection dome at the bottom end of its descending compressor column, conduit means to discharge compressed gas from the collection dome of each preceding unit to the collection dome of the last unit of the succession thereof, a high pressure compressor of maximum depth comprising a descending compressor column communicating at its bottom end with a conduit means to provide a rising final liquid discharge passage and at its top end with the bottom of the last unit of the succession of low pressure compression units to receive flow of compressing liquid therefrom, a gas inspirator means adapted to deliver low pressure gas from the collection dome of the last unit of the succession of low pressure compression units into the top of the descending compressor column of the high pressure compressor, a compressed gas collection done at the bottom of the descending compressor column of said high pressure compressor, and conduit means adapted to discharge high pressure gas from said last mentioned collection dome to a place of use.

2. In a hydraulic compressor system, a high pressure compressor of substantial depth adapted to receive compressing liquid from hydraulic low pressure compressor means, said high pressure compressor comprising a descending compressor column, an aspirator head communicating with the upper end of said compressor column and adapted to receive compressed gas from the low pressure compressor means, an inverted high pressure gas collection dome at the bottom end of said compressor column, a pipe adapted to discharge high pressure gas from the gas collection dome to a place of use, a discharge conduit to provide a rising passage to receive compressing liquid from said descending compressor column for discharge from the system, and mechanical means to agitate the liquid rising through said discharge passage, whereby dissolved gas contained in the rising liquid is induced to come out of solution into bubble formation and by rising and expanding to decrease the weight and thereby facilitate hydraulic lift of the discharging compressing liquid.

3. In a hydraulic compressor system, a high pressure compressor according to claim 2, including reduced pressure collecting means at the exit end of the discharge conduit passage adapted to detrain the bubbles of gas, brought out of solution from the discharging compressing liquid, for recovery thereof.

4. In a hydraulic compressor system, a high pressure compressor of substantial depth adapted to receive compressing liquid from hydraulic low pressure compressor means, said high pressure compressor comprising a descending compressor column, an aspirator head communicating with the upper end of said compressor column and adapted to receive compressed gas from the low pressure compressor means, an inverted high pressure gas collection dome at the bottom end of said compressor column, a pipe adapted to discharge high pressure gas from the gas collection dome to a place of use, a discharge conduit to provide a rising passage to receive compressing liquid from said descending compressor column for discharge from the system, and means to introduce a suspension of sharp sand in water into the lower end portion of the rising passage of said discharge conduit to mingle with the liquid flowing upwardly therethrough, whereby the sand particles, by their presence and differential movement relative to the discharging liquid, induce dissolved gas contained in the liquid to come out of solution in bubble formation, and by rising and expanding to decrease the weight and thereby facilitate hydraulic lift of the discharging compressing liquid.

5. In a hydraulic compressor system, a high pressure compressor according to claim 4, including reduced pressure collecting means at the exit end of the rising passage of said discharge conduit adapted to detrain the bubbles of gas, brought out of solution from the discharging compressing liquid, for recovery thereof.

References Cited in the file of this patent

UNITED STATES PATENTS

| | | |
|---|---|---|
| 669,995 | Linton | Mar. 19, 1901 |
| 854,009 | Webber | May 21, 1907 |
| 1,421,484 | Jennings | July 4, 1922 |
| 1,529,884 | Hall | Mar. 17, 1925 |
| 2,374,772 | Nordell | May 1, 1945 |

FOREIGN PATENTS

| | | |
|---|---|---|
| 13,568 | Great Britain | of 1900 |